United States Patent [19]
Arrigoni

[11] 4,400,915
[45] Aug. 30, 1983

[54] FIXTURE FOR RESTORING A FACE ON THE SHROUD OF A ROTOR BLADE

[75] Inventor: John P. Arrigoni, Wallingford, Conn.

[73] Assignee: United Technologies Corporation, Hartford, Conn.

[21] Appl. No.: 155,252

[22] Filed: Jun. 2, 1980

[51] Int. Cl.³ .................. B24B 41/06; B21K 3/04
[52] U.S. Cl. ....................... 51/217 R; 29/156.8 B
[58] Field of Search ............. 51/216 R, 217 R, 277; 29/156.8 R, 156.8 B; 33/174 C

[56] References Cited
U.S. PATENT DOCUMENTS

| | | | |
|---|---|---|---|
| 2,680,392 | 6/1954 | Gaved | 29/156.8 B |
| 4,033,569 | 7/1977 | Dunn | 51/217 R |
| 4,128,929 | 12/1978 | DeMusis | 51/217 R |

Primary Examiner—Harold D. Whitehead
Attorney, Agent, or Firm—Gene D. Fleischhauer

[57] ABSTRACT

A fixture 34 for positioning a shroud 22 of a worn rotor blade 14 with respect to an apparatus for removing material is disclosed. The fixture is formed of a base 42, an axial locator 44 which is adapted to engage the root 18 of the rotor blade, and a tangential locator 46 which engages the root of the rotor blade at a hinge joint 58 and which engages the airfoil 20 of the rotor blade. A method of restoring a shroud of the rotor blade axially with respect to the root and tangentially with respect to the airfoil is also disclosed. In an alternate embodiment, a second locator 160 for indexing the locator from an airfoil edge is included.

4 Claims, 12 Drawing Figures

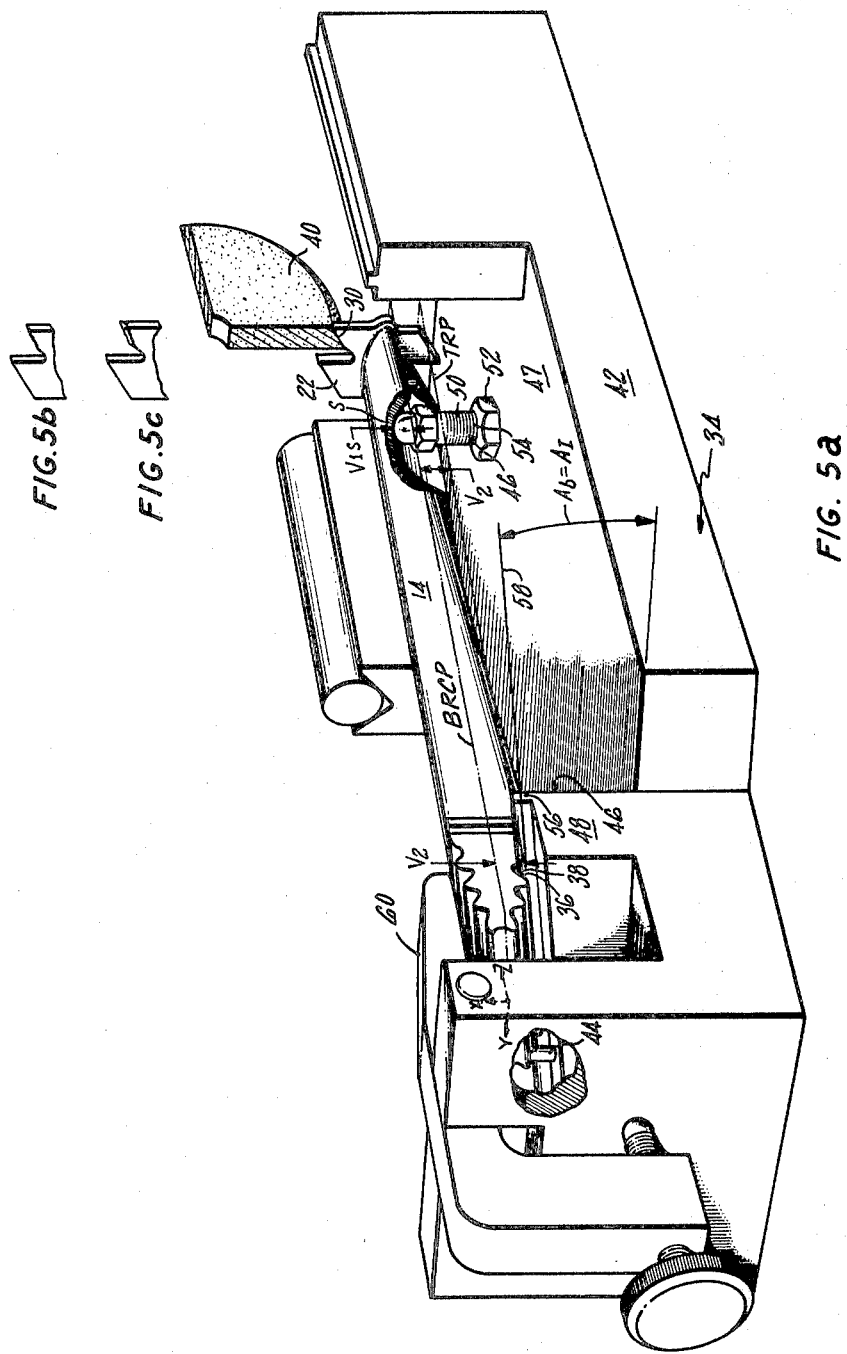

FIXTURE FOR RESTORING A FACE ON THE SHROUD OF A ROTOR BLADE

TECHNICAL FIELD

This invention relates to axial flow rotary machines and more particularly to a method and fixture for use in restoring the face of a shroud extending from a rotor blade of such a machine.

BACKGROUND ART

In an axial flow rotary machine, the rotor assemblies are commonly provided with rotor blades extending outwardly therefrom. The rotor blades have a root having a groove which is adapted to engage a corresponding groove in the disk for retention of the rotor blade. An airfoil extends outwardly from the root and is used as a flow directing assembly for working medium gases. The airfoil has a convex side and a concave side. Each rotor blade may also be provided with a shroud, such as a tip shroud at the outer end of the airfoil. The shroud extends circumferentially to engage the shrouds of adjacent rotor blades. During operation of the rotary machine, the rotor blades and shrouds are subjected to fluctuating gas loads and to high temperatures. These fluctuating gas loads induce vibrations in the blades which are damped by rubbing between the shrouds. Such rubbing causes wear. After the rotor blade has been used for some time, for example, 3000 hours of operation, it becomes necessary to restore the worn surfaces or discard the blade. An example of a method of restoring shrouds and of fixtures for use in such a method of restoration is shown in U.S. Pat. No. 4,128,929 entitled "Method of Restoring Worn Turbine Components" issued to DeMusis. The fixtures disclosed by DeMusis firmly clamp the root of the blade and restore the shroud axially, tangentially, and vertically with respect to the root.

DISCLOSURE OF INVENTION

In accordance with the present invention, the shrouds of rotor blades are restored axially with respect to the root and tangentially with respect to the airfoil to reduce rotation induced bending stresses in the airfoil.

A primary feature of the present invention is a fixture which rotatably engages the root of a rotor blade at a hinge joint and which is adapted to engage the blade at a second location along the span of the airfoil. Each rotor blade has a blade root center plane. Another feature of the present invention is the parallel orientation of the hinge joint with respect to the blade root center plane. In one embodiment the locator which engages the airfoil is indexed from an edge of the airfoil.

A principal advantage of the present invention is the accuracy which results from directly restoring a face of a shroud without grinding an intermediate reference surface. Another advantage is the reduced bending stresses which results from locating the shroud tangentially with respect to the airfoil rather than with respect to the root. An advantage is the precise nesting of the array of rotor blades each with the other which results from accurately locating the axial location of a shroud face with respect to the root while preserving the angular orientation of the notched surface with respect to the blade root center plane.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 5a is a perspective view of a fixture for positioning a rotor blade;

FIGS. 5b and 5c are diagrammatic illustrations of a portion of the shroud during the restoration process;

FIG. 6 is a diagrammatic view of a worn rotor blade supported in a fixture of the type shown in 5a;

BEST MODE FOR CARRYING OUT THE INVENTION

Figure 1:
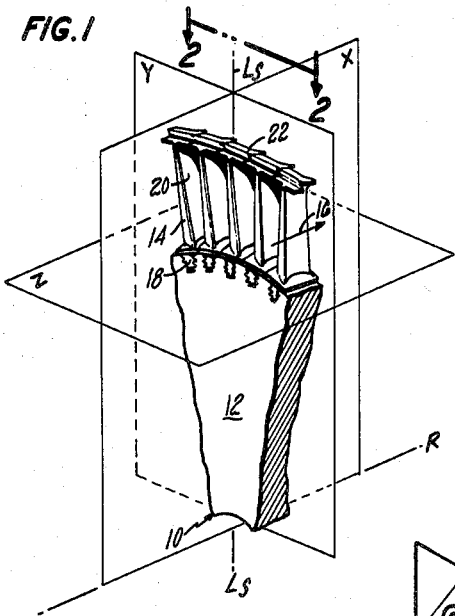
FIG. 1 is a partial perspective view of a portion of a rotor assembly for an axial flow rotary machine.

A gas turbine engine embodiment of an axial flow rotary machine is illustrated in the FIG. 1 partial perspective view. A portion of a rotor assembly 10 of the engine is shown. The rotor assembly includes a rotor disk 12 having an axis of rotation R and a plurality of rotor blades 14 extending outwardly from the disk. A flow path for working medium gases extends through the rotor assembly passing between adjacent rotor blades.

Each rotor blade 14 has a root 18, an airfoil 20 and a shroud, such as a tip shroud 22. As will be appreciated, the rotor blade might also have a part span shroud which is not shown. Dimensions of the rotor blade are measured from a reference X-plane, a reference Y-plane and a reference Z-plane. In the installed condition, these reference planes have a particular orientation with respect to the axis of rotation R of the rotor assembly. The reference X-plane extends in the axial direction and contains the axis of rotation R. The reference Y-plane is a radial plane perpendicular to the axis of rotation R. The X and Y planes intersect along a reference line, commonly called the stacking line $L_s$. The reference Z-plane is perpendicular to both the X and Y planes. The Z-plane intersects the stacking line and is a tangent plane at an arbitrary radius from the axis of rotation R. The X, Y and Z planes remain with the blade in its uninstalled condition.

Figure 2:
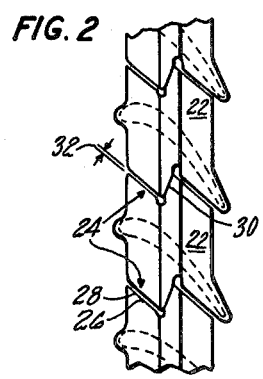
FIG. 2 is a plane view of the shrouds of such a rotor assembly taken along the lines 2—2.

FIG. 2 is a developed view from above of the array of rotor blades 14 and shows the engagement between the shrouds 22 of adjacent rotor blades. Each shroud has two tangential sides 24. Each tangential side has tangential faces 26 such as a shroud material face 28 and a notch face 30. The notch face of one shroud engages the notch face of the adjacent shroud leaving a gap 32 therebetween. As will be realized, the gap 32 is a clearance between shrouds and is minimized to prevent the leakage of working medium gases from the flow path 16. The rubbing contact between notch faces during operation provides blade damping.

Figure 3:
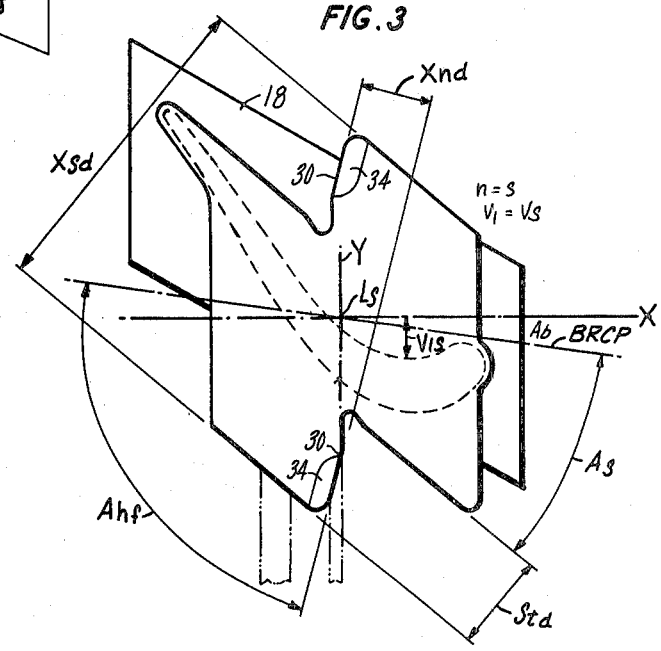
FIG. 3 is an enlarged view of a single shroud of FIG. 2.

As shown in FIG. 3 the notch face 30 might be provided wih a hard facing material 34 such as tungsten carbide, which is especially suited to resist wear due to rubbing contact. A blade root center plane BRCP, perpendicular to the Z-plane and passing through the stacking line $L_s$ extends through the center of the root. The blade root center plane intersects the top surface of the shroud as indicated. The blade root center plane is at an angle $A_b$ with respect to the reference X-plane. The angle $A_b$ is commonly called the broach angle. The contour of the airfoil is defined by a plurality of airfoil sections each airfoil section n being spaced a distance $V_{ln}$ from the blade root center plane as measured along a line perpendicular to the reference X-plane and parallel to the Y-plane. A particular airfoil section s is shown. The distance $X_{nd}$ is the distance between the notch faces 30 of the shroud and is commonly referred to as the cross notch dimension. The angle between a plane parallel to the hard face material and the blade root center plane is commonly called the hard face angle $A_{hf}$. The larger distance between the shroud material faces 28 $X_{sd}$ is commonly called the cross shroud dimension. The angle between a plane parallel to a shroud material face and the blade root center plane BRCP is commonly called the shroud angle $A_s$. The distance $S_{td}$ is the distance between shroud material faces on the same tangential side of the shroud and is called the step dimension.

Figure 4:
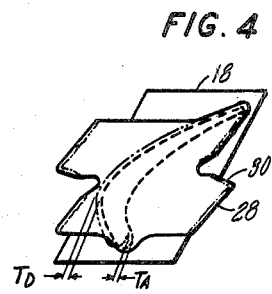
FIG. 4 is a top view of a rotor blade showing the wear on the faces and the axial and tangential dislocation of an airfoil section with respect to the root in phantom.

During operation of the gas turbine engine the rotational loads and fluctuating gas loads exerted by the working medium gases cause the rotor blades to vibrate slightly in a tangential direction pivoting about the root 18 along a line parallel to the blade root center plane BRCP. The rubbing contact between the notch faces 30 of the shrouds dampens these vibrational movements. After many hours of operation the notch faces 30 experience wear. The notch faces may wear to such an extent that the gap 32 is no longer sufficient to prevent contact between the shroud material faces 28 of adjacent shrouds causing these faces to wear. The wear on the notch faces and the shroud material faces is shown in phantom in FIG. 4. Moreover, the airfoil dislocates tangentially and axially during operation as the working medium gases are flowed along the flow path for working medium gases 16 at high temperatures. The resultant dislocation is shown in phantom in exaggerated fashion. For example, a rotor blade having a length of four inches from shroud to root may dislocate tangentially a distance $T_D$ equal to twelve thousandths of an inch (0.012 inches) and axially rearwardly a distance $T_a$ equal to four thousandths of an inch (0.004 inches) during 3000 hours of operation. The tangential faces may be restored, for example, by depositing material on the faces and grinding the material smooth. Restoration to the original position with respect to the root will result in an apparent displacement of the shroud tangentially and axially with respect to the dislocated airfoil because the airfoil has dislocated with respect to the root. After three such restorations, grinding the correct step dimension $S_{td}$ may result in grinding of the airfoil. In addition, the tangential dislocation, which is roughly three times as large as the axial dislocation discussed in the example above, shifts the airfoil tangentially with respect to the shroud after the shroud is restored. The airfoil shifts away from the center of gravity of the shroud. This results in an unbalanced force acting on the airfoil due to the weight of the shroud during operation of the rotor assembly. Because of the high rotational speeds, cracking may occur at the juncture between the airfoil and shroud. Accordingly, it is important to take into account the tangential dislocation of the airfoil with respect to the root when restoring the tangential faces of the shroud.

FIG. 5a shows a fixture 34 for positioning a shroud 22 of a worn rotor blade 14. The rotor blade has a groove 36 in the root bounded by a wall 38. The fixture positions the blade with respect to a means for removing material, such as a grinding wheel 40, during the removal of such material to form a face such as a notch face 30 on a tangential side of the shroud. The fixture is formed of a base 42, an axial locator 44 and a tangential locator 46 both engaging the base. The base has a reference surface 47. The tangential locator includes a first locator 48 and a second locator 50. The second locator is perpendicular to the reference surface 47 and is vertically adjustable by means of a locknut 52 and a screw-type engagement 54 between the second locator and the base. The first locator has a means, such as the curved edge 56, for establishing a hinge joint with a rotor blade parallel to the blade root center plane BRCP and parallel to the wall 28 on the root of such a blade. The hinge joint is rotatable about a reference line 58. The reference line 58 is spaced a distance $V_2$ from the blade root center plane when the blade is in the supported condition. The angle between the reference line 58 and the surface 47 is equal to the broach angle $A_b$.

A means, such as clamp 60, for rotatably urging the rotor blade about the hinge joint extends between reference line 58 of the hinge joint and the second locator.

The height of the second locator is adjusted and the orientation of the grinding wheel 58 is established by use of an unused blade 14. An unused blade is placed in the fixture as shown in FIG. 5. The height of the second locator 50, which is perpendicular to the surface of the base, is adjusted until a plane passing through the reference line and through a point on the second locator is spaced a distance $V_2$ from the blade root center plane at all points and has a constant angle of inclination $A_I$ to the reference surface of the base. The angle of inclination is equal to the broach angle. As will be realized, the distance from the airfoil section engaged by the second locator is equal to the distance from the particular airfoil section s to the blade root center plane, $V_{1s}$, plus the distance from the blade root center plane to the tangential reference plane $V_2$. This distance is called $V_3$, i.e., $V_3 = V_{1s} + V_2$.

During restoration of a tangential face 26 such as a notch face 30 the position of the notch face of an unused blade defines the desired tangential face for the shroud 22 of a used blade 14. The grinding wheel 58 is positioned so that the face of the grinding wheel abuts the desired tangential face to establish the orientation of the grinding wheel. A used blade, having a worn tangential face corresponding to the notch face 30 is selected as shown in FIG. 5b. Material is deposited on the face as shown in FIG. 5c. The face is then restored by removing material from the tangential face until the tangential face and the desired tangential face are coincident by using the established orientation of the grinding wheel. Thus, using the new blade and the fixture and having the root of the new blade in abutting engagement with the axial locator 44 and a first locator 48 of the tangential locator 46 locates the desired tangential face in the axial direction (Y direction perpendicular to the Y-plane) and the vertical direction (Z direction perpendicular to the reference Z-plane) with respect to the root as a corresponding face of the unused blade is located wih respect to the root of the unused blade. Similarly using the new blade in the fixture and having the airfoil of the new blade in abutting engagement with the second locator 50 locates the desired tangential face in the tangential direction (X direction perpendicular to the reference X-plane) with respect to the airfoil as the corresponding face of the unused blade is located with respect to the airfoil of the unused blade.

Figure 6:
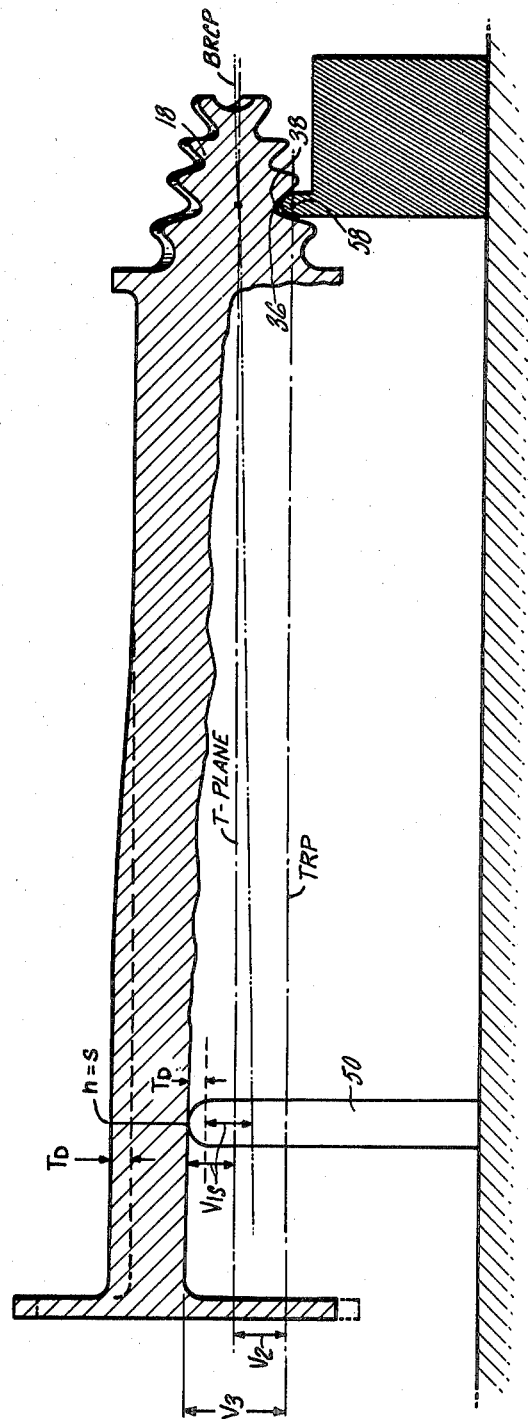

FIG. 6 illustrates the advantage of adjusting for tangential dislocation of the airfoil by locating on the airfoil. As shown, the airfoil has dislocated tangentially a distance $T_D$ from the original contour which is shown by dotted lines. The reference line 58 is parallel to the blade root center plane and parallel to the wall 38 of the groove 36 in the root 18. A tangential reference plane TRP passes through a point on the second locator 50. The point is spaced a distance $V_3$ from the point on the airfoil section s of the used blade. The distance $V_3$ is equal to the sum of the distances $V_{1s}$, which is the distance the airfoil section s is spaced from the blade root center plane of the blade in the unused condition as designed, plus the distance $V_2$ which is the distance from the blade root center plane to the tangential reference plane TRP. Because the airfoil has dislocated tangentially, the blade root center plane has rotated about a line parallel to the reference line 58 and the distance from the blade root center plane to the tangential reference plane TRP is no longer $V_2$. A new reference T-plane is established parallel to the TRP plane. The reference T-plane passes through a point spaced a distance $V_{1s}$ from the airfoil section s and spaced a distance $V_2$ from a tangential reference plane.

FIG. 7a, FIG. 7b, FIG. 7c and FIG. 7d illustrate an alternate embodiment of the invention having a means for indexing a second locator 150 from an edge of the airfoil 20 such as a leading edge 160 or a trailing edge 162. The second locator is formed of a slidable block 162, a pin 164 extending from the block which is adapted to engage a flow direction surface on the airfoil, such as the concave surface 166, and a means for indexing the pin from an edge of the airfoil which engages the slidable block and which is adapted to engage an edge of the airfoil such as the second pin 168. A means for locking the slidable block to the base of the fixture, such as the screw 170, is provided.

Figure 7A:
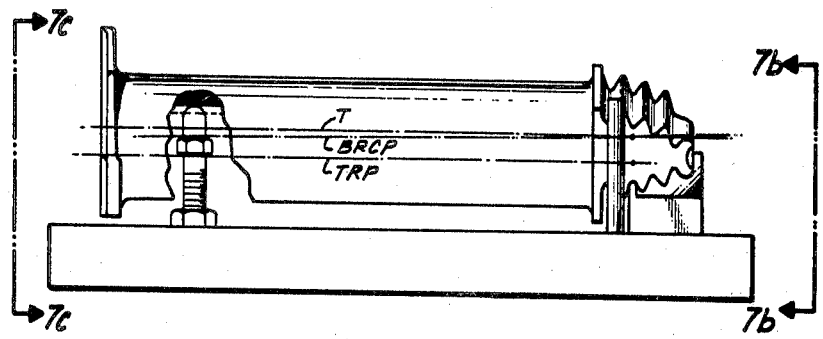
FIG. 7a is a side elevation diagrammatic view of a rotor blade in a fixture with a portion of the blade broken away to show reference planes.
Figure 7B:
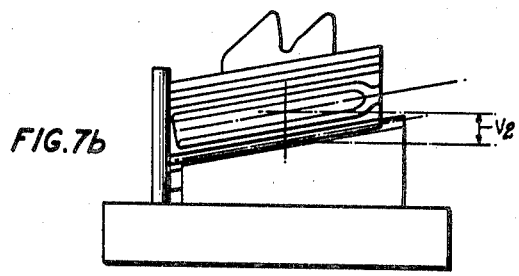
FIG. 7b is an end view taken along the lines 7b—7b.
Figure 7C:
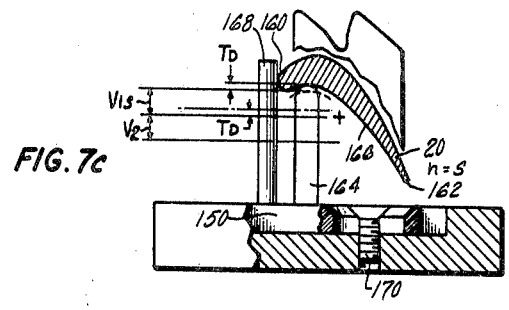
FIG. 7c is an end view taken along the lines 7c—7c; with a portion of the shroud broken away to show an airfoil section s.
Figure 7D:
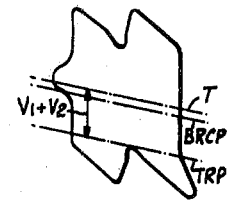
FIG. 7d corresponds to FIG. 7c and shows the shroud surface intersected by reference planes.

The dotted line in FIG. 7c shows the position of the concave surface before dislocation of the airfoil tangentially to the used position. The distances $V_{1s}$, $V_2$ and $T_D$ are shown substantially the same as they are shown in FIG. 6. As shown in FIG. 7a, the blade root center plane BRCP and the reference T-plane intersect at a line parallel to the reference line 58. A cylinder having a radius equal to the distance from the point of intersection of the T-plane and the blade root center plane to the shroud and the axis of the cylinder laid along the line representing the intersection of the T-plane with the blade root center plane, would intersect the blade root center plane and the T-plane at two parallel lines. However, as shown in FIG. 7a and FIG. 7d the shroud represents a plane intersecting the blade root center plane BRCP and the reference T-plane. Accordingly, the blade root center plane is essentially parallel to the reference T-plane. For a four inch blade which has suffered a tangential dislocation of less than fifty hundredths of an inch (0.050 inches) a negligible error is introduced into the orientation of the reference T-plane with respect to the blade root center plane. Accordingly, the hard face angle $A_{hf}$ is restored almost exactly as the hard face angle found in an unused blade. Moreover because the blade uses an edge of the root as an axial locator, the axial location of the restored face is exactly the same as an unused blade. As a result, a blade restored by this technique nests very well with the similarly restored blades and new blades.

It should be understood that the invention is not limited to the particular embodiments shown and described herein, but that various changes and modifications may be made without departing from the spirit and scope of this novel concept as defined by the following claims.

I claim:

1. A fixture for positioning a shroud of a worn rotor blade with resepct to a means for removing material during the removal of such material to form a face on the tangential side of a shroud, the rotor blade being adapted for use in an axial flow rotary machine and including a root, a center plane passing through the root, a groove in the root bounded by a wall and including an airfoil, the airfoil being defined by a plurality of airfoil sections positioned from a stacking line formed by the intersection of a plane extending in the axial direction and a plane extending in the tangential direction, which comprises:

a base;
   an axial locator engaging the base which is adapted to engage the root of the rotor blade and to prevent movement of the root in the axial direction;
   a tangential locator engaging said base formed of
      a first locator means for rotatably engaging the root of the rotor blade to form a hinge joint parallel to the blade root center plane and parallel to the wall on the root, and
      a second locator means for engaging the airfoil of the rotor blade; and,
   means for rotatably urging the said rotor blade about said hinge joint to urge said rotor blade into engagement with said second locator means;
   wherein the tangential locator defines a tangential reference plane for measuring the tangential location of the shroud face and is adpated to adjust for the tangential dislocation of a worn airfoil by engaging a point on the airfoil and wherein the axial locator and said first locator define a reference plane for measuring the axial location of the shroud surface with respect to the root of the airfoil which is parallel to the stacking line of the rotor blade.

2. The fixture according to claim 1 wherein the fixture positions a rotor blade having a root which has a leading edge and a trailing edge and wherein the axial locator is adapted to engage an edge of the root.

3. The fixture according to claim 1 wherein the tangential reference plane is essentially parallel to the blade root center plane of a blade installed in the fixture.

4. The fixture according to claims 1, 2 or 3 wherein the fixture is adapted to position a rotor blade having a leading edge, a trailing edge and flow directing surfaces extending therebetween wherein the first locator of the tangential locator is formed of a block having a curved edge, and wherein the second locator is formed of a slidable block, a pin extending from the block which is adapted to engage a flow directing surface on the airfoil, means extending from the block for indexing the pin from an edge of the airfoil which is adapted to engage an edge of the airfoil, and means for locking the slidable block to the base of the fixture.

* * * * *

UNITED STATES PATENT AND TRADEMARK OFFICE
CERTIFICATE OF CORRECTION

PATENT NO. : 4,400,915
DATED : August 30, 1983
INVENTOR(S) : John P. Arrigoni

It is certified that error appears in the above-identified patent and that said Letters Patent is hereby corrected as shown below:

| | |
|---|---|
| Col. 2, line 26: | after "7c" (third occurrence) delete ";" |
| Col. 3, line 6: | before "a hard" change "wih" to "with" |
| Col. 4, line 33: | should not be a new paragraph |
| Col. 5, line 5: | after "located" change "wih" to "with" |
| Col. 6, line 17: | after "with" change "resepct" to "respect" |
| Col. 6, line 43: | after "and is" change "adpated" to "adapted" |

Signed and Sealed this

Ninth Day of July 1985

[SEAL]

Attest:

DONALD J. QUIGG

Attesting Officer    Acting Commissioner of Patents and Trademarks